(12) United States Patent
Weis

(10) Patent No.: US 9,829,111 B2
(45) Date of Patent: Nov. 28, 2017

(54) VALVE DEVICE

(71) Applicant: CONTINENTAL AUTOMOTIVE GMBH, Hannover (DE)

(72) Inventor: Christian Weis, Budenheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/365,832

(22) PCT Filed: Dec. 18, 2012

(86) PCT No.: PCT/EP2012/075912
§ 371 (c)(1),
(2) Date: Jun. 16, 2014

(87) PCT Pub. No.: WO2013/092561
PCT Pub. Date: Jun. 27, 2013

(65) Prior Publication Data
US 2014/0339452 A1  Nov. 20, 2014

(30) Foreign Application Priority Data
Dec. 19, 2011  (DE) ................ 10 2011 089 080

(51) Int. Cl.
*F16K 1/22* (2006.01)
*F16K 1/226* (2006.01)
*F16K 41/10* (2006.01)

(52) U.S. Cl.
CPC ............ *F16K 1/224* (2013.01); *F16K 1/2268* (2013.01); *F16K 41/10* (2013.01); *F16K 41/106* (2013.01)

(58) Field of Classification Search
CPC ........ F16K 1/224; F16K 1/2268; F16K 41/10; F16K 41/106
USPC ......... 251/305, 306, 307, 308; 123/336, 337
See application file for complete search history.

(56) References Cited

U.S. PATENT DOCUMENTS

| 3,497,180 | A | * | 2/1970 | Ryen | F16K 1/228 251/192 |
| 3,782,685 | A | * | 1/1974 | Gallagher | F16K 1/221 251/306 |
| 4,225,112 | A | * | 9/1980 | Libke | F16K 1/2265 251/214 |
| 4,516,754 | A | * | 5/1985 | Owoc | F16K 41/106 251/214 |
| 5,401,001 | A | * | 3/1995 | Cook | F01N 3/2053 251/308 |
| 5,632,304 | A | * | 5/1997 | Kempka | F02D 9/06 137/595 |

(Continued)

FOREIGN PATENT DOCUMENTS

| CN | 201650508 | 11/2010 |
| DE | 11 79 049 B | 10/1964 |

(Continued)

*Primary Examiner* — Mary McManmon
*Assistant Examiner* — Richard K Durden
(74) *Attorney, Agent, or Firm* — Cozen O'Connor

(57) ABSTRACT

A valve device has a housing, and a flow channel running in the housing, in which a valve flap is fastened on a shaft arranged perpendicularly to the flow direction. The shaft is rotatably mounted in housing. The bearing formed as a loose bearing is surrounded by a spring retainer, the base of which lies on a bearing bush of the loose bearing and has a jacket surface with a radial wavy shape.

5 Claims, 1 Drawing Sheet

(56) References Cited

U.S. PATENT DOCUMENTS

| | | | | | |
|---|---|---|---|---|---|
| 5,749,336 | A | * | 5/1998 | Tamaki | F02D 9/104 123/337 |
| 5,975,128 | A | * | 11/1999 | Schatz | F02D 9/06 123/323 |
| 6,135,415 | A | * | 10/2000 | Kloda | F02M 25/0724 123/568.18 |
| 6,766,580 | B2 | * | 7/2004 | Nanba | F02D 9/101 29/407.09 |
| 9,518,514 | B2 | * | 12/2016 | Evers | F02D 9/04 |

FOREIGN PATENT DOCUMENTS

| | | | | |
|---|---|---|---|---|
| DE | 41 13 019 A1 | | 10/1992 | |
| DE | 103 07 471 A1 | | 11/2004 | |
| DE | WO 2014086557 A1 | * | 6/2014 | F02D 9/04 |
| EP | 1 493 951 | | 1/2005 | |
| GB | 1501936 A | * | 2/1978 | F16K 41/10 |
| JP | 01112085 A | * | 4/1989 | F16K 1/226 |
| JP | H02-93183 | | 4/1990 | |
| WO | WO 93/25804 A1 | | 12/1993 | |

\* cited by examiner

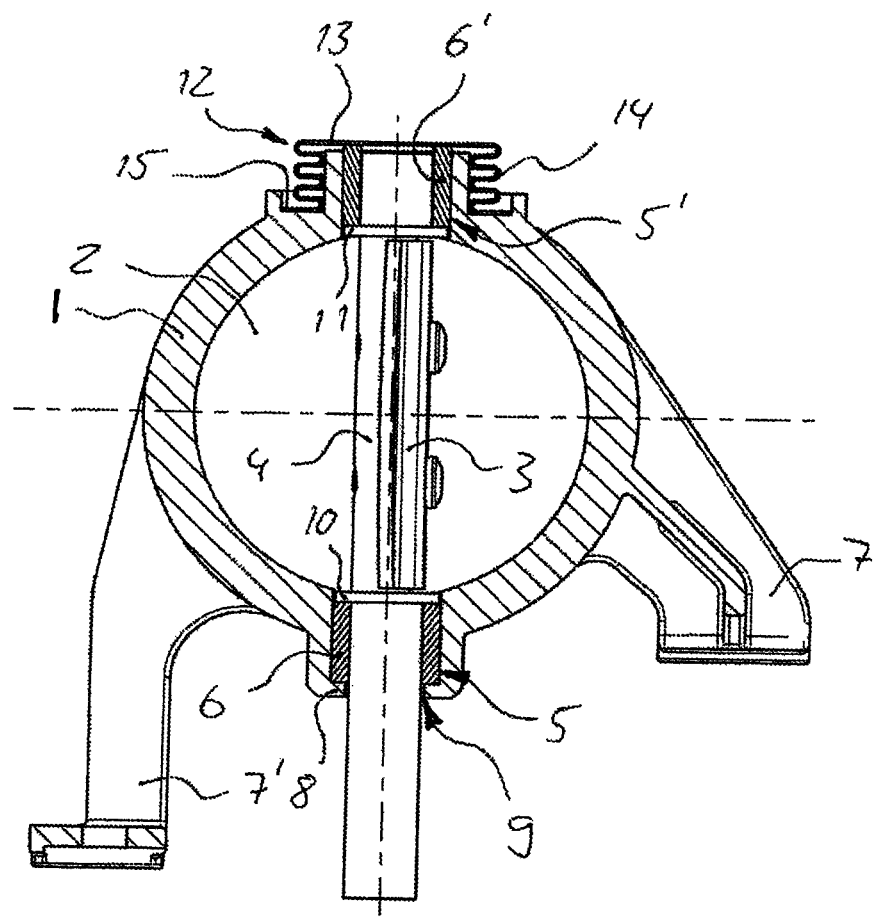

VALVE DEVICE

CROSS-REFERENCE TO RELATED APPLICATIONS

This is a U.S. national stage of application No. PCT/EP2012/075912, filed on 18 Dec. 2012, which claims priority to the German Application No. 10 2011 089 080.7, filed 19 Dec. 2011, the content of both incorporated herein by reference.

BACKGROUND OF THE INVENTION

1. Field of the Invention

The invention relates to a valve device having a housing and having a flow duct which runs in the housing and in which a valve flap is fastened to a shaft arranged perpendicular to the flow direction, wherein the shaft is mounted rotatably in the housing.

2. Related Art

Valve devices of this type are typically used as exhaust-gas flaps in motor vehicles and are thus known. In the case of the known exhaust-gas flaps, the shaft is mounted, on both sides of the flow duct, in each case one bearing bushing. The bearing bushings are arranged in corresponding bores of the housing and are in the form of a fixed bearing and a floating bearing. The bores in the housing additionally have seals in order to prevent the exhaust gas that flows in the flow duct from passing out into the environment through the bores.

SUMMARY OF THE INVENTION

The invention is based on an object of providing a valve device which permits secure and reliable mounting of the shaft with the fewest possible components while ensuring reliable operation of the valve device.

The object is achieved in that the bearing, which is in the form of a floating bearing, is surrounded by a spring pot, the base of which spring pot bears against a bearing bushing of the floating bearing and the shell surface of which spring pot has a radially undulating shape.

The arrangement of a spring pot serves firstly to realize the sealing of the bearing point. At the same time, the spring pot serves to generate the preload of the floating bearing, such that the shaft can be mounted axially without play. No additional components are required for the two functions.

In one advantageous refinement, the spring pot surrounds the housing part that surrounds the bore.

Good cooling of the spring pot, with simultaneously good spring characteristics, are achieved if the spring pot is composed of metal.

For an improved connection of the spring pot to the housing, the spring pot has a flange by which it bears against the housing.

For a sealed connection that prevents the escape of gases from the flow duct, the flange is welded or screwed to the housing. It is conceivable here for an additional seal to be provided.

BRIEF DESCRIPTION OF THE DRAWING

The invention will be explained in more detail on the basis of an exemplary embodiment. In the FIGURE:

FIG. 1 shows a valve device according to the invention, in section.

DETAILED DESCRIPTION OF THE PRESENTLY PREFERRED EMBODIMENTS

The valve device in FIG. 1 is composed of a housing 1 and of a flow duct 2, which runs in the housing 1 and in which a valve flap 3 is fastened to a shaft 4 arranged perpendicular to the flow direction. The shaft 4 is mounted rotatably in the housing 1. For the bearing arrangement, the housing has bores 5, 5' in which bearing bushings 6, 6' are arranged. The housing 1 can be connected to other components by webs 7, 7'. In the illustration shown, the fixed bearing is arranged in the bore 5. For this purpose, the bore 5 has a base 8, which has an opening 9 through which the shaft 4 extends as far as a drive (not illustrated). The bearing bushing 6 bears against the base 8, the bearing bushing being delimited, at its opposite side, by a collar 10 of the shaft 4. The bore 5' receives the bearing bushing 6' without restricting the axial movement of the bearing bushing 6'. A collar 11 of the shaft 4 bears against the bearing bushing 6' at the flap side. The bearing bushing 6' is arranged in the bore 5' so as to project partially out of the bore 5'. A spring pot 12 surrounds the housing part that surrounds the bore 5'. The spring pot 12 is composed of a base 13, which bears against the bearing bushing 6', and of a radially undulating shell surface 14. The spring pot 12 bears, by way of a flange 15, against the housing 1. The structure of the undulating shell surface 14 generates a spring force, such that the base 13 generates a force in the direction of the bearing bushing 6', which leads to a preload of the floating bearing, thus giving rise to a bearing arrangement, which is free from axial play. For sealing of the bore 5', and for the generation of the spring force, the flange 15 is welded to the housing 1. Aside from the illustrated embodiment, it is also possible for the floating bearing and fixed bearing to be interchanged, such that the floating bearing with the spring pot is then arranged on the side facing toward the drive of the shaft. In this variant, the base of the spring pot likewise bears against the bearing bushing and is interrupted only for the leadthrough of the shaft.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve device comprising:
   a housing, the housing having a housing wall portion defining a bore;
   a flow duct arranged in the housing;
   a shaft mounted rotatably in the housing, the shaft being arranged perpendicular to a flow direction in the flow duct;
   a valve flap arranged in the housing, the valve flap being fastened to the shaft;

a floating bearing having the bore defined by the housing wall portion and a bearing bushing; and a spring pot at least partially surrounding so as to be radially beyond both the housing wall portion defining the bore and the bearing bushing of the floating bearing, the spring pot having:

a base that bears against the bearing bushing of the floating bearing, and a shell surface having a radially undulating shape, wherein the bearing bushing is arranged in the bore so as to partially project out of the bore.

2. The valve device as claimed in claim 1, wherein the spring pot comprises metal.

3. The valve device as claimed in claim 1, wherein the spring pot has a flange connected to the housing.

4. A valve device comprising:

a housing;

a flow duct arranged in the housing;

a shaft mounted rotatably in the housing, the shaft being arranged perpendicular to a flow direction in the flow duct;

a valve flap arranged in the housing, the valve flap being fastened to the shaft;

a floating bearing having a bore and a bearing bushing; and a spring pot surrounding the floating bearing, the spring pot having:

a base that bears against the bearing bushing of the floating bearing, and a shell surface having a radially undulating shape, wherein the bearing bushing is arranged in the bore so as to partially project out of the bore, and wherein the bore of the floating bearing is surrounded by a part of the housing, and wherein the spring pot surrounds the part of the housing that surrounds the bore.

5. A valve device comprising:

a housing;

a flow duct arranged in the housing;

a shaft mounted rotatably in the housing, the shaft being arranged perpendicular to a flow direction in the flow duct;

a valve flap arranged in the housing, the valve flap being fastened to the shaft;

a floating bearing having a bore and a bearing bushing; and a spring pot surrounding the floating bearing, the spring pot having:

a base that bears against the bearing bushing of the floating bearing, and a shell surface having a radially undulating shape, wherein the bearing bushing is arranged in the bore so as to partially project out of the bore, wherein the spring pot has a flange connected to the housing, and wherein the flange is welded or screwed to the housing.

* * * * *